(12) United States Patent
Miller

(10) Patent No.: US 7,537,840 B2
(45) Date of Patent: May 26, 2009

(54) POLYAMIDE ADHESIVE AND ARTICLES INCLUDING THE SAME

(75) Inventor: Richard A. Miller, Kingsport, TN (US)

(73) Assignee: H.B. Licensing & Financing, Inc., St. Paul, MN (US)

( * ) Notice: Subject to any disclaimer, the term of this patent is extended or adjusted under 35 U.S.C. 154(b) by 897 days.

(21) Appl. No.: 10/912,381

(22) Filed: Aug. 5, 2004

(65) Prior Publication Data

US 2006/0029820 A1 Feb. 9, 2006

(51) Int. Cl.
*B32B 27/34* (2006.01)
*C08L 77/00* (2006.01)

(52) U.S. Cl. .................. 428/474.4; 428/477.7; 428/458; 525/178

(58) Field of Classification Search .............. 428/474.4, 428/477.7, 458; 525/178
See application file for complete search history.

(56) References Cited

U.S. PATENT DOCUMENTS

| | | | |
|---|---|---|---|
| 3,626,026 A | 12/1971 | Fukumura et al. | |
| 4,018,733 A * | 4/1977 | Lopez et al. | 524/357 |
| 4,132,690 A | 1/1979 | Eernstman et al. | |
| 4,181,775 A | 1/1980 | Corke | |
| 4,743,238 A | 5/1988 | Colon et al. | |
| 4,791,164 A | 12/1988 | Wichelhaus et al. | |
| 4,810,772 A | 3/1989 | Leoni et al. | |
| 4,876,125 A * | 10/1989 | Akao et al. | 428/35.2 |
| 5,024,887 A | 6/1991 | Yamane | |
| 5,385,986 A * | 1/1995 | Frihart et al. | 525/420.5 |
| 5,441,998 A | 8/1995 | Teeters et al. | |
| 5,512,625 A | 4/1996 | Butterbach et al. | |
| 5,548,027 A | 8/1996 | Heucher et al. | |
| 5,750,605 A * | 5/1998 | Blumenthal et al. | 524/230 |
| 5,859,093 A | 1/1999 | McBride | |
| 6,268,466 B1 | 7/2001 | MacQueen et al. | |
| 6,562,888 B1 | 5/2003 | Frihart et al. | |
| 6,716,527 B1 | 4/2004 | Czmok et al. | |
| 2004/0127614 A1 | 7/2004 | Jiang et al. | |

FOREIGN PATENT DOCUMENTS

| | | | |
|---|---|---|---|
| JP | 56 062864 A | 5/1981 | |
| JP | 62-250053 A | 10/1987 | |

* cited by examiner

*Primary Examiner*—James Seidleck
*Assistant Examiner*—Saira Haider

(57) ABSTRACT

A hot melt adhesive composition that includes thermoplastic polyamide, adhesion promoter that includes at least one acid group, and wax having a melting point greater than 82° C.

30 Claims, No Drawings

POLYAMIDE ADHESIVE AND ARTICLES INCLUDING THE SAME

BACKGROUND

The invention is directed to forming a fiber tearing adhesive bond to metallized polymer film.

Metallized polymer films are increasingly being used as packaging materials. Many packaging applications require the package to be sealed with an adhesive composition. This presents a problem for applications in which the packaging material includes a metallized polymer film, because it is very difficult to form an adhesive bond to a metallized polymer film. Adhesive compositions often exhibit adhesive failure at the interface between the metallized film and the adhesive composition. In many applications, adhesive failure is unacceptable because the packaging is designed with the expectation that the adhesive composition will maintain a sufficiently strong bond to the metallized film until the package is opened. In many of these packaging applications, the adhesive bond must be stronger than the substrates being bonded such that when the package is opened at the adhesive seal, one or more of the bonded substrates tear. The difficulty associated with forming a sufficient adhesive bond to a metallized polymer film is exacerbated in packages that contain relatively heavy contents such as dry pet food, e.g., dog and cat food.

SUMMARY

In one aspect, the invention features a hot melt adhesive composition that includes thermoplastic polyamide, adhesion promoter that includes at least one acid group, and wax having a melting point greater than 82° C. In one embodiment, the adhesion promoter is an alkylene acrylic acid copolymer.

In some embodiments, the adhesive composition includes from 70% by weight to 90% by weight polyamide. In other embodiments, the adhesive composition includes from 65% by weight to 95% by weight the polyamide.

In one embodiment, the polyamide has an amine number of at least 2. In another embodiment, the polyamide has an amine plus acid number of at least 2 mg KOH/g. In some embodiments, the polyamide has an amine plus acid number no greater than about 30 mg KOH/g.

In other embodiments, the polyamide has a weight average molecular weight of from about 6000 to about 30,000. In another embodiment, the polyamide has a weight average molecular weight of from about 8000 to about 25,000. In some embodiments, the polyamide has a weight average molecular weight of from greater than 12,000 to about 15,000.

In some embodiments, the alkylene acrylic acid copolymer is ethylene acrylic acid. In other embodiments, the adhesive composition includes from 5% by weight to 30% by weight alkylene acrylic acid copolymer. In another embodiment, the adhesive composition includes from 10% by weight to 30% by weight alkylene acrylic acid copolymer. In still other embodiments, the adhesive composition includes from 10% by weight to 20% by weight alkylene acrylic acid copolymer.

In one embodiment, the wax includes a Fischer-Tropsch wax. In other embodiments, the wax includes mycrocrystalline wax. In other embodiments, the adhesive composition includes from greater than 3% by weight to 7% by weight the wax. In one embodiment, the adhesive composition includes from 4% by weight to 6% by weight the wax.

In other embodiments, the adhesive composition forms a fiber tearing bond to a metallized polyester substrate. In another embodiment, the adhesive composition, when coated on a metallized polyester film substrate, maintains a fiber tearing bond to the metallized polyester substrate after storage at −12° C. for 24 hours. In some embodiments, the adhesive composition, when coated on a metallized polyester substrate, maintains a fiber tearing bond to the metallized polyester substrate after storage at 60° C. for 24 hours.

In some embodiments, the adhesive composition exhibits a viscosity of no greater than 6000 centipoise at 177° C. In other embodiments, the adhesive composition exhibits a viscosity of no greater than 5000 centipoise at 177° C.

In another embodiment, the adhesive composition is nonblocking to a metallized polymeric film. In other embodiments, the adhesive composition is non-blocking to kraft.

In one embodiment, the adhesive composition further includes antioxidant.

In other embodiments, the adhesion promoter is selected from the group consisting of alkylene-maleic anhydride copolymers, n-alkylglutarimide/acrylic copolymers, 1,4-cyclohexylene dimethylene terephthalate, 1,4-cyclohexylene dimethylene isophthalate, ethylene-1,4-cyclohexylene dimethylene terephthalate, ethylene-ethyl acrylate, ionomeric resins, ethylene-methyl acrylate copolymer resins, ethylene-1,3-phenylene oxyethylene isophthalate, ethylene-1,3-phenylene oxyethylene terephthalate, ethylene-vinyl acetate copolymers, ethylene-vinyl acetate-vinyl alcohol copolymers, and combinations thereof.

In another aspect, the invention features an article that includes a metallized polymer film, and an adhesive composition disclosed herein bonded to the metallized film. In one embodiment, the adhesive composition exhibits a fiber tearing bond to the metallized polymeric film. In another embodiment, the adhesive composition is further bonded to kraft.

The present invention features a hot melt adhesive composition that exhibits a fiber tearing bond to metallized polymer film substrate and is nonblocking. The adhesive composition can also maintain a fiber tearing bond to a metallized polymer film substrate at cold temperatures. The adhesive composition can be applied using conventional hot melt coating equipment and is particularly well suited to application at temperatures less than about 182° C.

Other features and advantages will be apparent from the following description of the preferred embodiments and from the claims.

GLOSSARY

In reference to the invention, these terms have the meanings set forth below:

The term "zippering" refers to the audible noise that results when the adhesive bond, of an adhesive bonded laminate, fractures against a first substrate as the second substrate is pulled away from a the first substrate.

The term "nonblocking" means that the adhesive composition does not form an adhesive bond to a substrate that is placed in contact with the adhesive under pressure.

The term "fiber tearing bond" means an adhesive bond of sufficient strength such that the substrate to which the adhesive is bonded fails, e.g., tears, when attempting to separate the adhesive from the substrate.

DETAILED DESCRIPTION

The hot melt adhesive composition includes polyamide, adhesion promoter, and wax. The hot melt adhesive composition is a homogeneous blend of its various components. The adhesive composition preferably has a viscosity and a melt index such that it can be applied using conventional hot melt processing equipment at standard temperatures. Preferably the adhesive composition exhibits a viscosity of at least about 2500 centipoise (cP), no greater than about 6000 cP, or even no greater than about 5000 cP at 350° F. The adhesive composition preferably exhibits a glass transition temperature (Tg) of greater than −5° C., or even from −10° C. to −50° C., a shear adhesion failure temperature of from about 93° C. to about 121° C., a peel adhesion failure temperature of from about 71° C. to about 93° C., a metler drop point of from about 115° C. to about 138° C., and combinations thereof.

The hot melt adhesive composition is well suited to forming a fiber tearing bond to a metallized polymer film. The adhesive composition preferably maintains a fiber tearing bond to a metallized polymer film after storage at −12° C. for 24 hours, or even after storage at 60° C. for 24 hours. The adhesive also preferably forms a non "zippering" bond to a metallized polymer film. The hot melt adhesive composition also is non-blocking at room temperature, and is nonblocking to a kraft after exposure to 70 psi pressure for a period of 2 minutes.

The hot melt adhesive composition is heat activated at temperatures above about 148° C.

The polyamide of the adhesive composition is a thermoplastic polyamide having an amine number of no greater than about 2, an amine plus acid number of at least 2 mg KOH/g, or even no greater than about 30 mg KOH/g, a number average molecular weight (Mn) of from about 9000 to about 15,000, or even from about 7000 to about 25,000, and a weight average molecular weight (Mw) of at least about 6000, at least about 8000, at least about 12,000, at least about 13,000, no greater than about 30,000, no greater than about 25,000, no greater than about 18,000, or even no greater than about 15,000. Useful polyamides have a ring and ball softening point of at least 130° C., or even no greater than 145° C., and a viscosity of at least 4000 cP, at least 6000 cP, no greater than 15,000 cP, or even no greater than about 11,000 cP at 190° C.

Suitable polyamides include, e.g., the polycondensation product of a saturated aliphatic dicarboxylic acid having from 6 to 12 carbon atoms and a polyaminoacid prepared by direct homopolycondensation of an omega amnoalkanoic acid having a hydrocarbon chain containing from 4 to 12 carbon atoms, polyamides prepared by hydrolytic ring opening followed by the polymerization of lactams of the afore-mentioned acids, copolyamides prepared from the afore-mentioned monomers, and mixtures thereof.

Useful polyamides are commercially available under the UNI-REZ series of trade designations from Arizona Chemicals (Savannah, Ga.) including, e.g., UNI-REZ 2633 fatty acid dimer-based polyamide resin, UNI-REZ 2634, UNI-REZ 2635, UNI-REZ 2636, and UNI-REZ 2638. The adhesive composition preferably includes at least about 65% by weight, at least about 70% by weight, no greater than about 95% by weight, or even no greater than about 90% by weight polyamide.

The adhesion promoter is compatible with the polyamide, e.g., forms a homogeneous melt blend, and includes at least one acid group. At least some of the acid groups present on the adhesion promoter preferably graft to the polyamide. Preferred adhesion promoters are alkylene acrylic acid copolymers including, e.g., ethylene acrylic acid copolymers. Preferably the alkylene acrylic acid copolymer has an acid number of at least about 80 mg KOH/g, at least 110 mg KOH/g, no greater than 140 mg KOH/g, or even from about 110 mg KOH/g to about 130 mg KOH/g. The adhesive composition preferably includes at least 5% by weight, at least 10% by weight, about 15% by weight, no greater than 30% by weight, or even no greater than 20% by weight adhesion promoter. A useful commercially available alkylene acrylic acid copolymer is ethylene acrylic acid available under the trade designation A-C 5120 from Honeywell (Minneapolis, Minn.).

Other suitable adhesion promoters include, e.g., acid functional polyolefins (e.g., terpolymers of ethylene, butyl rubber, and acrylic acid), alkylene-maleic anhydride copolymers (e.g., ethylene-maleic anhydride copolymers, polypropylene-maleic anhydride copolymers, and combinations thereof), n-alkylglutarimide/acrylic copolymers, 1,4-cyclohexylene dimethylene terephthalate, 1,4-cyclohexylene dimethylene isophthalate, ethylene-1,4-cyclohexylene dimethylene terephthalate, ethylene-ethyl acrylate, ionomeric resins, ethylene-methyl acrylate copolymer resins, ethylene-1,3-phenylene oxyethylene isophthalate, ethylene-1,3-phenylene oxyethylene terephthalate, ethylene-vinyl acetate copolymers, ethylene-vinyl acetate-vinyl alcohol copolymers, and combinations thereof.

The wax of the hot melt adhesive composition has a melting point of at least 82° C., at least 93° C., no greater than 108° C., or even from about 97° C. to about 100° C. The wax preferably has a molecular weight less than 1500. Useful waxes include, e.g., Fischer-Tropsch waxes, microcrystalline waxes, amide waxes, low pressure waxes based on polyethylene waxes, montan waxes (i.e., blends of microcrystalline and paraffin waxes), metallocene waxes, and combinations thereof. The Fischer-Tropsch wax is a wax formed as a by-product in producing synthetic petroleum from coal by the Fischer-Tropsch process. Fischer-Tropsch waxes generally have a molecular weight from about 800 to about 1,300, and a melting point/softening point of from about 95° C. to about 115° C. Preferred Fischer-Tropsch waxes are straight chain hydrocarbons with minimal branching. Useful commercially available Fischer-Tropsch waxes are available under the trade designation BARECO PX-100, PX-105 from Baker Petrolite Polymers (Baker Hughes Inc., Houston, Tex.), and SASOL-WAX H-1 Fischer-Tropsch wax from Sasol Wax Americas, Inc. (Shelton, Conn.).

Microcrystalline waxes are hydrocarbons that include from 30 to 60 carbon atoms. Suitable microcrystalline waxes have a molecular weight from about 450 to about 700.

The adhesive composition preferably includes greater than 3% by weight, at least 4% by weight, no greater than about 7% by weight, or even no greater than about 6% by weight wax.

The adhesive composition can also include antioxidant. Preferred antioxidants include hindered phenols, e.g., tri- and tetra-functional hindered phenols. Useful commercially available antioxidants are available under the IRGANOX series of trade designations including IRGANOX 1010 and 1098 hindered phenol antioxidants from Ciba Specialty Chemicals, Inc. (Basil, Switzerland), and from Great Lake Chemicals (Indianapolis, Ind.).

The adhesive composition can also include other components including, e.g., filler, calcium carbonate, clay, silica, talc, and combinations thereof.

The hot melt adhesive composition is well suited to forming a fiber tearing bond to metallized polymer film, and substrates that include an exposed metallized polymer film. Metallized polymer films have a metallized surface layer deposited on a polymer film. Metallization, which occurs directly on the polymer film, can be accomplished by any suitable metallizing process including, e.g., vacuum deposition, electroplating, sputtering and combinations thereof. Aluminum is a common metal used in metallized films although other metals are suitable including, e.g., gold, silver, chromium, tin, copper, zinc, and combinations thereof.

Suitable metallized polymer films include, e.g., metallized polyester, metallized polyolefin (e.g., polypropylene, polyethylene, polypropylene homopolymer, ethylene propylene random copolymer, ethylene propylene butylene terpolymer, and propylene butylene copolymer), ethyl vinyl alcohol copolymers. Useful polyethylene films include, e.g., high density polyethylene (HDPE), medium density polyethylene (MDPE), linear low density polyethylene (LLDPE), low density polyethylene (LDPE).

The term "low density polyethylene" (LDPE) generally means an ethylene-containing polymer having a density of no greater than about 0.926 g/cm$^3$ and a melt index of about 7 g/10 min. The term "linear low density polyethylene" (LLDPE) generally means a copolymer of ethylene and a minor amount of an olefin containing from 4 to 10 carbon atoms, having a density of from about 0.910 g/cm$^3$ to about 0.926 g/cm$^3$, and a melt index of from about 0.5 g/10 min to about 10 g/10 min. The term "medium density polyethylene" (MDPE) generally means an ethylene-containing polymer having a density of from about 0.926 g/cm$^3$ to about 0.940 g/cm$^3$. The term "high density polyethylene" (HDPE) generally means an ethylene-containing polymer having a density of at least about 0.940 g/cm$^3$.

The metallized polymer film can include multiple layers, i.e., multilayer film, of polymer, adhesive, metal and various combinations thereof. The metallized polymer film can also be a component of a construction that includes, e.g., multiple substrates, multiple layers, a variety of different materials, and combinations thereof.

The adhesive composition is well suited to use in packaging applications including, e.g., forming seals, seams and destructive bonds between two or more substrates. The adhesive composition can form an adhesive bond in a variety of package structures including, e.g., bags, multilayer bags, (e.g., bags for animal food (e.g., dog food and cat food bags), liquid pouches, stand up pouches, pillow packaging, medical packaging, and boxes (e.g., beverage, beer, and cereal boxes). These packages are constructed from a variety of substrates including, e.g., paper, kraft, corrugated board, paper board, solid fiber paper board, polymer films, and metallized polymer films. Pet food bags, for example, are often constructed from multiple plys in which there is an inner ply of polyethylene, two plys (i.e., layers) of kraft, and an exterior layer, which in some cases a metallized polymer film.

In one embodiment, the package includes a first kraft substrate bonded to a metallized polymer film through the adhesive composition. The adhesive composition seals the package opening and forms a fiber tearing bond to the two substrates.

The invention will now be described by way of the following examples. The amounts indicated are in percent by weight unless otherwise indicated.

EXAMPLES

Test Procedures

Test procedures used in the examples include the following.

Shear Adhesion Failure Temperature (SAFT)

Shear adhesion failure temperature is determined according to ASTM D 4498-95, entitled, "Standard Test Method for Heat Fail Temperature in Shear of Hot Melt Adhesives." The substrate is 50 pound kraft.

Peel Adhesion Failure Temperature (PAFF)

Peel adhesion failure temperature is determined according to ASTM D PAFT is ASTM D903-93, entitled, "Standard Test Method for Peel or Stripping Strength of Adhesive Bonds." The substrate is 50 pound kraft.

Glass Transition Temperature (Tg)

Glass transition temperature is determined using differential scanning calorimetry (DSC) according to ASTM 6677 entitled, "Standard Test Method for Evaluating Adhesion by Knife."

Metler Drop Point

The metler drop point is determined according to ASTM D3954-94 entitled, "Standard Test Method for Dropping Point of Waxes."

Ring and Ball Softening Point

The ring and ball softening point is determined according to ASTM D 36-95 entitled, "Standard Test Method for Softening Point of Bitumen (Ring-and-Ball Apparatus)."

Adhesive Bond Strength

The hot melt adhesive composition is coated on a release paper using a 5 mil drawdown bar. When the adhesive composition is cool, the coated adhesive is cut into 1 in.×4 in. strips. The adhesive strips are then placed on 1 in×6 in. pieces of bag kraft. A 1 in.×6 in. strip of metallized polyester film is then placed, metal side down, on top of the adhesive strip.

The construction is then placed in a heat sealer that had been preheated to 350° F. (176.7° C.). The assembly is sealed at 70 pounds per square inch (psi) for two seconds.

The metallized polymer film substrate and the kraft substrate are then grabbed by each hand of an individual and pulled. The adhesive passes if the adhesive exhibits a fiber tearing bond. A fiber tearing bond is one in which substrate failure occurs, i.e., either the kraft or the metallized polyester film exhibits tearing. The adhesive fails if there is adhesive failure at an adhesive-substrate interface or cohesive failure.

Conditioning

Samples are stored at 10° F. (−12° C.) for 24 hours. The samples are removed from the condition and immediately tested according to the Adhesive Bond Strength Test Method.

Samples are stored at 140° F. (60° C.) for 24 hours. The samples are removed from the condition and immediately tested according to the Adhesive Bond Strength Test Method.

Blocking Test Method

The hot melt adhesive composition is coated on a release paper using a 5 mil drawdown bar. When the adhesive composition is cool, the coated adhesive is cut into 1 in.×4 in. strips. The adhesive strips are then placed on top of a ten pound (lb) metal weight and a five pound metal weight is then placed on top of the adhesive strip. After 24 hours the weights are removed and observed for adhesion.

A hot melt adhesive composition is deemed to be non-blocking if the surface of the weight is free of adhesive.

Melt Flow Rate

The melt flow rate (MFR) is determined by placing a material in a cylinder having an orifice with a diameter of 2.1 mm and a length of 8 mm, and the material melted is extruded at 190° C. under a load of 2,160 g. The weight of the material extruded for 5 to 240 seconds is measured, and then, converted to gram per 10 minutes, thereby obtaining the MFR value. The higher the MFR value, the more fluid the composition.

Example 1

A hot melt adhesive composition is prepared by combining 79.8% by weight UNI-REZ 2633 polyamide (Arizona Chemicals, Savannah, Ga.), 15% by weight A-C 5120 ethylene acrylic acid copolymer (Honeywell, Minneapolis, Minn.), 5% by weight PX-100 Fischer-Tropsch wax, and 0.2% by weight IRGANOX 1010 phenol antioxidant (Ciba Specialty Chemicals, Inc., Basil, Switzerland), in a mixer preheated to 177° C. and mixed at 177° C. for two hours to achieve a homogeneous blend.

The composition of Example 1 is tested according to the Adhesive Bond Strength Test Method and expected to exhibit substrate failure and to be non-zippering to the metallized polyester film.

The composition of Example 1 is tested according to the Blocking Test Method and expected to be nonblocking.

The composition of Example 1 is expected to exhibit a glass transition temperature (Tg) of −12° C. as measured according to differential scanning calorimetry (DSC), a viscosity of 14,175 cP at 149° C., 2675 cP at 163° C., and 4575 cP at 177° C., a shear adhesion failure temperature (SAFT) of 232° F. (111.1° C.), peel adhesion failure temperature (PAFT) of 89° C., and a metler drop point of 129.4° C.

Other embodiments are within the claims.

What is claimed is:

1. A hot melt adhesive composition comprising:
   thermoplastic polyamide;
   alkylene acrylic acid copolymer; and
   wax having a melting point greater than 82° C.
2. The adhesive composition of claim 1, comprising from about 70% by weight to about 90% by weight said polyamide.
3. The adhesive composition of claim 1, comprising from about 65% by weight to about 95% by weight said polyamide.
4. The adhesive composition of claim 1, wherein said polyamide has an amine number of at least 2.
5. The adhesive composition of claim 1, wherein said polyamide has an amine plus acid number of at least 2 mg KOH/g.
6. The adhesive composition of claim 1, wherein said polyamide has an amine plus acid number no greater than about 30 mg KOH/g.
7. The adhesive composition of claim 1, wherein said polyamide has a weight average molecular weight of from about 6000 to about 30,000.
8. The adhesive composition of claim 1, wherein said polyamide has a weight average molecular weight of from about 8000 to about 25,000.
9. The adhesive composition of claim 1, wherein said polyamide has a weight average molecular weight of from greater than 12,000 to about 15,000.
10. The adhesive composition of claim 1, wherein said alkylene acrylic acid copolymer is ethylene acrylic acid.
11. The adhesive composition of claim 1, comprising from 5% by weight to about 30% by weight said alkylene acrylic acid copolymer.
12. The adhesive composition of claim 1, comprising from about 10% by weight to about 30% by weight said alkylene acrylic acid copolymer.
13. The adhesive composition of claim 1, comprising from about 10% by weight to about 20% by weight said alkylene acrylic acid copolymer.
14. The adhesive composition of claim 1, wherein said wax comprises a Fischer-Tropsch wax.
15. The adhesive composition of claim 1, wherein said wax comprises mycrocrystalline wax.
16. The adhesive composition of claim 1, comprising from greater than 3% by weight to about 7% by weight said wax.
17. The adhesive composition of claim 1, comprising from about 4% by weight to about 6% by weight said wax.
18. The adhesive composition of claim 1, wherein said adhesive composition forms a fiber tearing bond when bonded to a metallized polyester substrate.
19. The adhesive composition of claim 1, wherein said adhesive composition, when coated on a metallized polyester substrate, maintains a fiber tearing bond to the metallized polyester substrate after storage at −12° C. for 24 hours.
20. The adhesive composition of claim 1, wherein said adhesive composition, when coated on a metallized polyester substrate, maintains a fiber tearing bond to the metallized polyester substrate after storage at 60° C. for 24 hours.
21. The adhesive composition of claim 1, wherein said adhesive composition exhibits a viscosity of no greater than 6000 centipoise at 177° C.
22. The adhesive composition of claim 1, wherein said adhesive composition exhibits a viscosity of no greater than 5000 centipoise at 177° C.
23. The adhesive composition of claim 1, wherein said composition is non-blocking to a metallized polymer film.
24. The adhesive composition of claim 1, wherein said composition is non-blocking to kraft.
25. The adhesive composition of claim 1, further comprising antioxidant.
26. An article comprising:
   a metallized polymer film; and
   an adhesive composition bonded to said metallized film, said adhesive composition comprising
      thermoplastic polyamide,
      alkylene acrylic acid copolymer, and
      wax having a melting point greater than 82° C.
27. The article of claim 26, wherein said adhesive composition exhibits a fiber tearing bond to said metallized polymer film.
28. The article of claim 26, wherein said adhesive composition is further bonded to kraft.
29. The article of claim 26, wherein said adhesive composition is further bonded to a second metallized polymer film.
30. A hot melt adhesive composition comprising:
   thermoplastic polyamide;
   adhesion promoter comprising at least one acid group; and
   wax having a melting point greater than 82° C.

* * * * *